Feb. 16, 1932. W. O. AMSLER 1,845,824
APPARATUS FOR CONDUCTING MOLTEN GLASS
Filed April 18, 1928
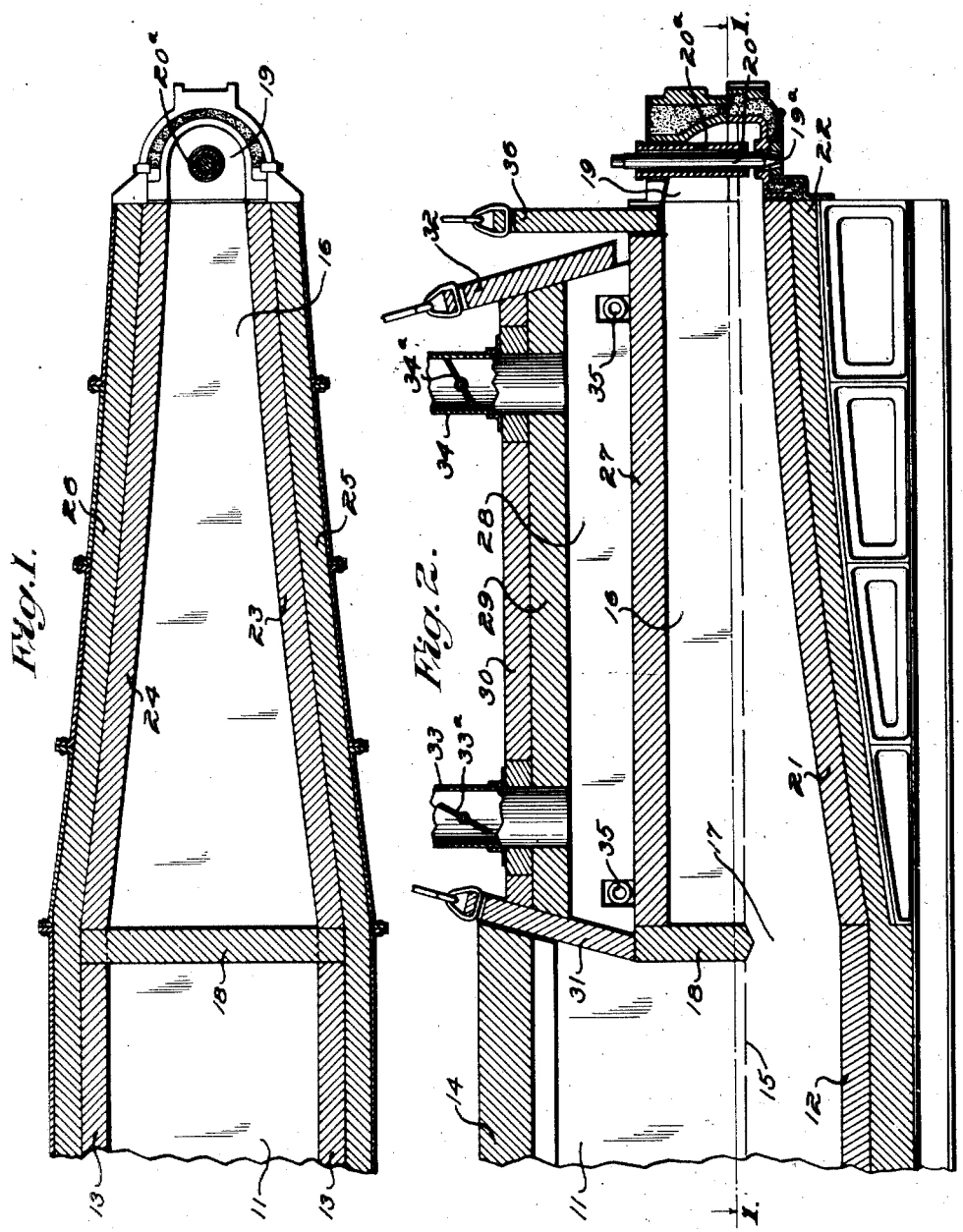
Witness.
Winslow B. Thayer.
Inventor;
Walter O. Amsler
by Robson D. Brown
Attorney.

Patented Feb. 16, 1932

1,845,824

UNITED STATES PATENT OFFICE

WALTER O. AMSLER, OF HARTFORD, CONNECTICUT, ASSIGNOR TO HARTFORD-EMPIRE COMPANY, OF HARTFORD, CONNECTICUT, A CORPORATION OF DELAWARE

APPARATUS FOR CONDUCTING MOLTEN GLASS

Application filed April 18, 1928. Serial No. 271,037.

This invention relates to glass melting tanks. It is common to have such tanks divided into two compartments or chambers, usually by means of a bridge wall extending across the entire width of the tank and down into the glass and may also extend upwardly to provide a shadow wall so that the hot gases from the melting end of the tank cannot pass into the fining chamber end. The molten glass passes through the submerged throat under the bridge wall from the melting chamber into the fining chamber, but because of the exclusion of the hot gases, the temperature of the fining chamber is usually much lower than the temperature of the melting chamber. The terms "melting chamber" and "fining chamber", as used herein, apply to those portions of the glass tank which are usually so called and are not intended to define the operations taking place in such chambers, as there may be some question as to just how far the fining operation extends.

The fining chamber, at one end, is in communication with the melting chamber through the submerged throat, and at the other end of the fining chamber, provision is usually made for the withdrawal of the glass as required, either by means of an automatic feeder of any suitable type or in any other suitable manner. The glass enters the fining chamber through the throat, which is of a relatively large cross-sectional area, and passes into the feeding chamber through a passage of relatively small cross-sectional area. There may be one or several such feeders connected with the same glass tank. Because the temperature of the glass in the fining chamber is much less than in the melting chamber and because the glass therein is much more viscous, the stream of glass flowing from the throat to each feeder makes a channel for itself through glass which has little or no movement and is more or less stagnant. This stagnant glass pulls off to some extent and follows the stream into the feeder, thereby causing cords due to non-homogeneity. The contour of the stream of glass leading from the throat to any one feeder will be curved. As the outer portions of the flowing stream of glass move toward the feeder outlet, there will be a tendency for them to swerve more toward the center of the stream at the beginning of flow, while at the feeder outlet end, the outer portions of the flowing stream will be moving more nearly parallel to the line of flow of the middle of the stream.

It is one of the objects of the invention to eliminate the formation of pockets of stagnant glass, such as have been hereinbefore described, by a method and apparatus for securing a uniform flow throughout the entire body of the glass as it passes from the melting chamber to the feeding chamber. More specifically, this is accomplished by providing a flow channel, the contour of which approximates that of the stream of glass which flows through the larger body of stagnant glass in the fining chamber of the usual construction. In general, the stream of flowing glass in the fining chamber starts with a large cross-sectional area and a low velocity and moves toward the feeder outlet with a gradually decreasing cross-sectional area and a gradually increasing velocity.

One specific form of curve that corresponds to the general form described above is one in which the rate of decrease in area, or width, or depth is exactly proportional to the area, or width, or depth where the decrease is taking place. Another way of defining such a curve is to state that any two cross-sectional areas, or widths, or depths spaced a unit distance apart have a constant ratio to each other. If for a given curve the above statements are true with respect to the rate of decrease, similar statements will be true with respect to the rate of increase from the small end to the large end. That is, the rate at which the cross-section increases per unit length is proportional to the cross-section at that point. This type of change is sometimes called the law of organic growth.

Such a curve is also sometimes called an exponential curve because it may be written in the form: $a = AK^x$. Where $a=$ cross-sectional area at a distance $x$ from the initial cross-sectional area A and $K=$ a constant.

While a flow channel constructed with a cross-sectional area which gradually increases from the work-out or feeding end thereof to the inlet from the melting chamber in accordance with the law of organic growth is considered to be preferable, it is to be understood that the invention is not to be so restricted except in accordance with the appended claims. Preferably both width and depth are designed to follow this type of curve, but either may be of such a character while the other is not. In other words, the width and depth of this flow chamber are increased according to a geometrical progression. As is well known, in a geometrical progression the terms $A$; $AR$; $AR^2$; $AR^3$; etc., bear a constant relation with each other, each term being obtained from the preceding term by multiplying the preceding term by a constant, called the constant ratio $R$. Where there are $N$ terms in the progression, the first term is $A$ and the last term is $AR(n-1)$. Thus, in applicant's flow channel, for example, the width at the discharge end of the flow channel may correspond to the first term of the geometrical progression, the width at a distance of a unit length from the discharge end toward the furnace end of the channel may equal the first term multiplied by a constant ratio, the width at a farther distance of a unit length may equal the second term multiplied by the constant ratio, etc., and the width at the furnace end of the flow channel may equal the last term of the geometrical progression.

While such a flow channel is capable of general application, the specific embodiment shown herein is in connection with a glass feeder. Features of the invention therefore relate more particularly to the use of such a flow channel between a melting tank and a glass feeding chamber. The molten glass from the melting tank is at a considerably higher temperature than is suitable for use in a feeder. In passing through the flow channel, the temperature of the glass is gradually lowered from the temperature of the melting tank to the proper temperature for the glass feeding chamber. It is one of the objects of the invention to provide improved means for regulating the temperature change which takes place between the melting tank and the feeding chamber.

In order to explain the invention more clearly, reference is made to the accompanying drawings, in which:

Figure 1 is a sectional plan view of a flow channel embodying structural features of one form of the invention and is taken on the line 1—1 of Fig. 2; and Fig. 2 is a sectional elevation of the apparatus shown in Fig. 1.

A glass tank 11 has a bottom 12, side walls 13 and a top 14, all of refractory material, and carries glass to a depth 15 at a temperature somewhat greater than is suitable for use in molds. A flow channel 16 is located adjacent to the glass tank 11 and is connected therewith by means of an opening 17. A bridge wall 18 may be provided in the upper part of this opening and extends below the glass line so that the hot gases cannot pass into the flow channel, but the molten glass is permitted to pass from the glass tank to the flow channel through the submerged throat.

At the other end of the flow channel is a feeding chamber or forehearth 19 which may have a submerged outlet 19a through which glass is discharged under the control of a vertically reciprocating implement 20. A vertically adjustable refractory tube 20a preferably surrounds the implement and regulates the flow of glass to the outlet. Both the depth and the width of the portion of the flow channel occupied by the glass are smaller at the feeding chamber end than at the glass tank end. The flow channel 16 has a bottom 21 of refractory material, and outside of this refractory material there is provided heat insulating material 22. This bottom is curved from the melting tank end to the feeding chamber end, preferably in substantial accordance with the law of organic growth, as stated above. The side walls 23 and 24 are also provided with insulation 25 and 26 and are curved from the large end to the small end of the flow channel in substantial accordance with the law of organic growth.

In order to more clearly explain the manner in which these curves are laid out, the following numerical examples are given. Suppose the cross-sectional area of the large end is 585 square inches and the cross-sectional area of the small end is 59.5 square inches and the flow channel is 10 feet long and it is desired to find the area of each of the intermediate cross-sections one foot apart, the areas of the first and last cross-sections being as given above. The logarithm of 59.5 is substracted from the logarithm of 585 and the difference is divided by 10. This result is the logarithm of the ratio of successive cross-sections, which ratio is 1.255. Each cross-sectional area is then found by multiplying the previous cross-sectional area by this constant. Performing these multiplications, the different cross-sections will be found to have the following areas:

| Section | Area—square inches |
|---|---|
| 0 | 59.5 |
| 1 | 74.7 |
| 2 | 93.9 |
| 3 | 118.1 |
| 4 | 148.5 |
| 5 | 186.6 |
| 6 | 234.5 |
| 7 | 296.0 |
| 8 | 370.3 |
| 9 | 466.0 |
| 10 | 585.0 |

Also, the same method may be applied for obtaining a linear dimension such as the width instead of the area. If the flow channel is 14 inches wide at the feeding chamber end and 36 inches wide at the melting tank end, then the difference between the logarithms of these two numbers is divided by 10. The number of which this is the logarithm is 1.099. By multiplying each preceding width by this multiplier, the widths of the arbitrarily selected divisions of the flow channel will be found to be as follows:

| Section | Width |
|---|---|
| 0 | 14 |
| 1 | 15 3/8 |
| 2 | 16 7/8 |
| 3 | 18 1/2 |
| 4 | 20 3/8 |
| 5 | 22 1/2 |
| 6 | 24 5/8 |
| 7 | 27 1/8 |
| 8 | 29 3/4 |
| 9 | 32 3/4 |
| 10 | 36 |

It is to be noted that in each of the cases illustrated, the area, the width, and the depth of each section varies from its preceding section by a constant ratio and that the successive areas, widths and depths, constitute geometrical progressions in which the area, width and depth respectively of the first section constitute the first terms and in which the area, width and depth respectively of the tenth section constitute the last terms and in which the ratios respectively constitute the rates of the progressions.

A horizontal heat conducting baffle 27 of refractory material covers the upper part of the flow channel and above this baffle is a compartment 28 into which gases may be introduced for controlling the temperature in the flow channel 16. These may be either hot gases for heating the channel or they may be cool gases when it is desired to lower the temperature of the channel. The top wall of the compartment 28 is lined with refractory material 29 and this may be covered with heat insulating material 30.

An adjustable gate 31 may be provided between the melting tank 11 and the compartment 28. A similar adjustable gate 32 may be provided at the feeding chamber end of the compartment, opening to the atmosphere. A stack 33 having a damper 33a therein may be provided adjacent to the fining chamber end of the compartment 28. A similar stack 34 controlled by a damper 34a may be provided adjacent to the feeding chamber end of the compartment. One or more burners 35 may be provided for heating the compartment when desired. An adjustable gate 36 is usually provided for closing the flow channel against the flow of glass to the feeding chamber when it is desired to make adjustments or changes at the feeder.

In operation, the glass flows slowly from the melting tank 11 through the flow channel 16 at a gradually increasing velocity towards the feeding chamber 19. During its passage through the flow channel, the temperature of the glass gradually decreases from the temperature of the melting tank to the lower temperature suitable for the operation of the feeder 20. If the tendency is for the glass to cool too rapidly, gate 31 and stack 34 may be opened and the hot gases from the glass tank 11 drawn through compartment 28 so as to heat the flow channel. If the tendency is for the glass to cool too slowly, the gate 32 and the stack 33 may be opened and cool air drawn through the compartment 28 so as to cool the flow channel 16. The burners 35 may be operated to assist the heating that is derived from the gases from the glass tank 11, or they may be used instead of such gases. The heat insulation which surrounds the flow channel 16 and the compartment 28 assists materially in making the arrangement capable of close temperature control.

It will thus be seen that means have been provided for securing a flow of glass uniform throughout any given cross-section from the melting tank to the glass feeding chamber while at the same time the temperature of such glass is reduced from that of the hot glass melting tank to the somewhat lower temperature of the feeding chamber by means which gives close control of such tempering of the glass.

While the drawings show and the description refers to one flow channel 16 there may be a plurality of such flow channels connected to the main glass tank and supplying a plurality of feeders. It is to be understood that the embodiment described above is for the purpose of illustration only, and various changes may be made in the construction and arrangement of parts without departing from the spirit and scope of the invention as defined in the appended claims.

I claim:

1. A glass melting tank structure, comprising a glass tank, a glass feeding chamber, and a flow channel of continuously decreasing cross-sectional area between said glass tank and said feeding chamber, the rate of said decrease in area being relatively great at the larger end of said flow channel as compared with the rate of decrease at the smaller end of the channel.

2. A channel for the flow of glass, one end of said channel having a greater cross-sectional area than the other end thereof, the cross-sectional area varying continuously from one end of the channel to the other end thereof, said variation being at a faster rate per unit length of channel where the cross-sectional area is greater.

3. A channel for the flow of glass, one end of said channel having a greater cross-sectional area than the other end thereof, the cross-sectional area varying continuously from the smaller end of the channel to the larger end thereof in substantially a geometrical progression.

4. A glass melting tank structure, comprising a glass tank, a glass feeding chamber, and a flow channel between said glass tank and said feeding chamber, the opening between said channel and said glass tank having a relatively large cross-sectional area and the opening between said channel and said feeding chamber having a relatively small cross-sectional area, the cross-sectional area progressively increasing from the small end to the large end in substantially a geometrical progression.

5. A glass melting tank structure, comprising a glass tank, a glass feeding chamber, and a flow channel between said glass tank and said feeding chamber, there being an opening between said channel and said glass tank having a relatively large cross-sectional area and there being an opening between said channel and said feeding chamber having a relatively small cross-sectional area, the cross-sectional area progressively increasing from the small end to the large end, the increase in cross-sectional area per unit length of channel at any part of the channel being substantially proportional to the total area of that part of the channel.

6. A glass melting tank structure, comprising a glass tank, a glass feeding chamber, and a flow channel between said glass tank and said feeding chamber, there being an opening between said channel and said glass tank having a relatively large cross-sectional area and there being an opening between said channel and said feeding chamber having a relatively small cross-sectional area, the ratio between the areas of any two adjacent intermediate cross-sections spaced a unit distance apart being substantially the same for any part of the channel.

7. A glass melting tank structure, comprising a glass tank, a glass feeding chamber, and a flow channel between said glass tank and said feeding chamber of continuously decreasing depth, the rate of said decrease in depth being relatively great at the deeper end of the flow channel as compared with said rate of decrease at the more narrow end of said channel.

8. A channel for the flow of glass, one end of which has a greater depth than the other end thereof, the depth changing continuously from the more shallow end of the channel to the deeper end thereof substantially in a geometrical progression.

9. A glass melting tank structure, comprising a glass tank, a glass feeding chamber, and a flow channel between said glass tank and said feeding chamber, the opening between said channel and said glass tank having a relatively great depth and the glass receiving portion of the opening between said channel and said feeding chamber having a relatively small depth, the depth progressively increasing from the small end to the large end of the channel substantially in a geometrical progression.

10. A glass melting tank structure, comprising a glass tank, a glass feeding chamber, and a flow channel between said glass tank and said feeding chamber of continuously decreasing width, the rate of said decrease in width being relatively great at the wider end of the flow channel as compared with said rate of decrease at the more narrow end of said channel.

11. A channel for the flow of glass, one end of which has a greater width than the other end thereof, the width changing continuously from one end of the channel to the other end thereof substantially in a geometrical progression.

12. A glass melting tank structure, comprising a glass tank, a glass feeding chamber, and a flow channel between said glass tank and said feeding chamber, the opening between said channel and said glass tank having a relatively large width and the opening between said channel and said feeding chamber having a small width, the width progressively increasing from the small end to the large end substantially in a geometrical progression.

13. A glass melting tank structure, comprising a glass tank, a glass feeding chamber, a flow channel between said glass tank and said feeding chamber, a baffle above said channel, a compartment above said baffle, an adjustable gate between the glass tank and one end of said compartment, and an adjustable stack adjacent to the other end of said compartment.

14. A glass melting tank structure, comprising a glass tank, a glass feeding chamber, a flow channel between said glass tank and said feeding chamber, a baffle above said channel, a compartment above said baffle, an adjustable gate at the feeding chamber end of said compartment for controlling the admission of cool gases, and an adjustable stack adjacent to the glass tank end of said compartment.

15. A glass melting tank structure, comprising a glass tank, a glass feeding chamber, a flow channel between said glass tank and said feeding chamber, a compartment above said channel, an adjustable gate between the glass tank and one end of said compartment, a second adjustable gate at the feeding chamber end of said compartment, an adjustable stack adjacent to each end of said compartment, and heating means for said compartment.

16. A glass melting tank structure, comprising a glass tank, a glass feeding chamber, a flow channel between said glass tank and said feeding chamber, a bridge wall between said channel and said glass tank extending below the glass line, a compartment above said channel, an adjustable gate between the glass tank and one end of said compartment, and an adjustable stack adjacent to the other end of said compartment.

17. A glass melting tank structure, comprising a glass tank, a glass feeding chamber, a flow channel between said glass tank and said feeding chamber, a bridge wall between said channel and said glass tank extending below the glass line, a compartment above said channel, an adjustable gate between the glass tank and one end of said compartment, a second adjustable gate at the feeding chamber end of said compartment, an adjustable stack adjacent to each end of said compartment, and heating means for said compartment.

18. A glass melting tank structure, comprising a glass tank, a glass feeding chamber, a flow channel between said glass tank and said feeding chamber, the portion of said flow channel occupied by the glass having a gradually decreasing cross-sectional area, the rate of said decrease in area being relatively great at the larger end of the flow channel as compared with said rate at the smaller end of said channel, and temperature controlling means for said flow channel.

19. A glass melting tank structure, comprising a glass tank, a glass feeding chamber, a flow channel between said glass tank and said feeding chamber, the portion of said channel occupied by the glass having an opening between said channel and said glass tank of relatively large cross-sectional area and also having an opening between said channel and said feeding chamber of relatively small cross-sectional area, the cross-sectional area of that portion of the channel occupied by the glass progressively increasing from the small end to the large end substantially in a geometrical progression, and temperature controlling means for the flow channel.

20. A glass melting tank structure, comprising a glass tank, a glass feeding chamber, a flow channel between said glass tank and said feeding chamber, the portion of said channel occupied by the glass having an opening between said channel and said glass tank of relatively large cross-sectional area and also having an opening between said channel and said feeding chamber of relatively small cross-sectional area, the cross-sectional area of that portion of the channel occupied by the glass progressively increasing from the small end to the large end substantially in a geometrical progression, and a compartment above said channel into which a temperature influencing median may be introduced for regulating the temperature of said channel.

Signed at Hartford, Connecticut, this 13th day of April, 1928.

WALTER O. AMSLER.

CERTIFICATE OF CORRECTION.

Patent No. 1,845,824.                                              Granted February 16, 1932, to

WALTER O. AMSLER.

It is hereby certified that error appears in the printed specification of the above numbered patent requiring correction as follows: Page 4, line 53, claim 7, for the word "narrow" read shallow; and that the said Letters Patent should be read with this correction therein that the same may conform to the record of the case in the Patent Office.

Signed and sealed this 12th day of April, A. D. 1932.

M. J. Moore,
Acting Commissioner of Patents.

(Seal)